May 3, 1938.  S. NONAKA  2,116,037
PARACHUTE
Filed July 31, 1935
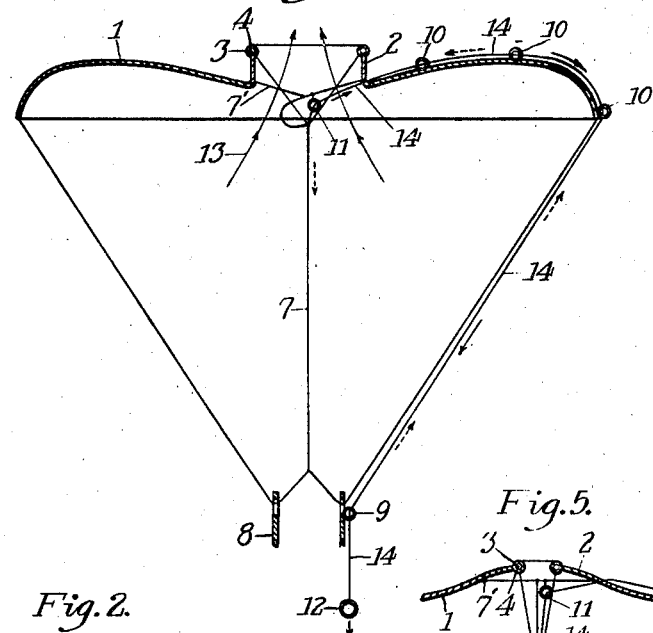
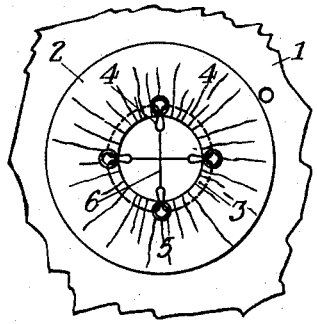
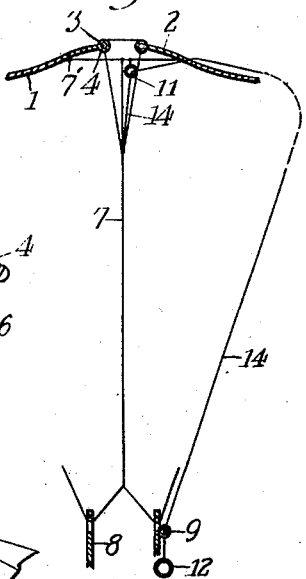
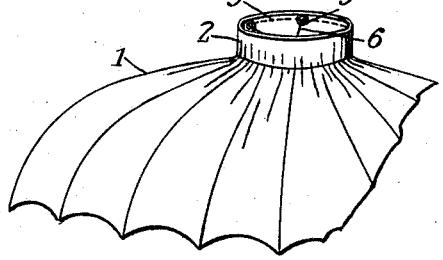
Inventor:
S. Nonaka, Patented May 3, 1938

2,116,037

UNITED STATES PATENT OFFICE 2,116,037

PARACHUTE

Sueto Nonaka, Naoiri-gun, Japan

Application July 31, 1935, Serial No. 34,073

2 Claims. (Cl. 244—152)

This invention relates to a parachute usually employed as life-saving means for use from disabled aircraft. The object of the invention is to provide an improved parachute which permits the descending wearer to adjust at will the rate of descent, attaining the most rapid descent, if so desired, by adjusting atmospheric pressure confined in the parachute body during the descent.

With the above object in view, the parachute according to this invention comprises a parachute body having an air escape port centrally formed therein, a movable annular flap forming the annular edge of said air escape port adapted to be throttled, a group of operating cords for actuating said annular flap for opening and closing said air escape port, and a pull cord operatively connected to said operating cords for actuating said operating cords, the arrangement being such that atmospheric pressure in the parachute body may be varied and determined by the degree of pull of the said pull cord connected to the operating cords.

In the accompanying drawing in which one embodiment of the invention is shown by way of example,—

Figure 1 is a perspective view of the umbrella or parachute body;

Figure 2 is an inner view of the central portion of the parachute body, showing the air escape port;

Figure 3 is a diagrammatic view showing the connection of the operating cords for adjusting said air escape port;

Figure 4 shows in an enlarged scale the air escape port and means for adjusting same; and Figure 5 is a similar view showing the relation of the operating cords and the central suspension cord when the air escape port is throttled.

Similar numerals of reference refer to similar parts throughout the several views.

Referring to the drawing, 1 designates the umbrella or parachute body made of fabric, the central portion of which is cut out and is provided with a short cylindrical flap portion 2 made of fabric, forming an adjustable air escape port. The annular free edge of said flap portion 2 is formed with a bead or tube 3, through which is passed a cord 4. The tube 3 is provided with four eyelets 5 arranged diametrically opposite to each other as shown in Fig. 2, and operating cords 6 are connected to the annular cord 4 which is passed through said four eyelets 5. The free ends of said operating cords 6 are converged into one point and connected to a point in the upper portion of central suspension cord 7 which in turn is connected at its upper end to a horizontal supporting cord 7'. A suspension band 8 of the harness is provided with a small ring 9. Small rings 10 are attached to the back of the parachute body 1 and on the periphery thereof. Still another ring 11 is attached to the horizontal supporting cord 7' or to the upper end of the suspension cord 7. A pull cord 14, having at one end a pull ring 12, passes through said guide rings 9 and 10 and, running along the back of the parachute body 1, extends to the inner side of the parachute body through a hole formed therein, and then passes through the ring 11, and it is connected to the point of connection of the operating cords 6 and the central suspension cord 7.

It is to be understood that the pull cord 14 is not necessarily passed along the back of the parachute body 1 as shown, but it may be passed along the inner side of the parachute body for the same purpose.

During the descent with the parachute according to this invention opened, a pull on the pull ring 12 which is suspended along the band 8 of the harness will move the pull cord 14 in the direction of arrows shown in full lines in Fig. 4, whereby the upper portion of the central suspension cord 7 is slacked, so that the operating cords 6 for the annular cord 4 passing through the annular edge of the flap 2 are also slacked. Consequently, the air escape port is enlarged, the fabric forming the cylindrical flap 2 being acted upon by air pressure as shown by 13. Thus, atmospheric pressure confined by the parachute body immediately decreases, increasing thereby the rate of descent.

Now, when the pull cord 14 is released, it moves in the direction of arrows shown in dotted lines in Fig. 4, and the upper portion of the central suspension cord 7 is naturally tensioned, so that the cylindrical flap portion 2 is turned down, throttling the air escape port formed thereby, as shown in Fig. 5. Consequently, the atmospheric pressure confined by the parachute body will increase, thus decreasing the rate of descent.

From the foregoing, it will be seen that according to this invention the descending speed can readily be controlled at will by manipulating the pull cord 14, and by slacking the central suspension cord 7, thereby adjusting the effective area of the air escape port at the top of the parachute body. Thus, the parachute according to this invention permits the wearer to descend more promptly than the normal rate of descent when so desired, yet enabling the safe landing.

What I claim is:—

1. In combination with a parachute comprising a parachute body having peripherally attached shroud lines, an air escape port centrally formed therein and a movable flap normally closing said escape port; of a central suspension cord kept taut by the weight of any passenger, a group of operating cords connected to said central suspension cord and to said flap, and means for slacking said central suspension cord, whereby said flap is opened.

2. In combination with a parachute comprising a parachute body having an air escape port centrally formed therein, a movable flap for the escape port adapted to be throttled; of a central suspension cord, a group of operating cords connected to said central suspension cord and to said flap of the air escape port and adapted to release said movable flap forming said air escape port when said central suspension cord is slacked, and a pull cord connected to an upper portion of said central suspension cord and adapted when pulled to slack said central suspension cord, the normal position of the flap being such as to close the port.

SUETO NONAKA.